United States Patent
Chen (10) Patent No.: US 6,686,534 B2
(45) Date of Patent: Feb. 3, 2004

(54) SMALL-SCALED PORTABLE ELECTRICAL POWER GENERATOR

(76) Inventor: I-Ming Chen, No. 60, Lane 328, Li-Shan St., Nei-Hu Dist., Taipei (TW)

( * ) Notice: Subject to any disclaimer, the term of this patent is extended or adjusted under 35 U.S.C. 154(b) by 0 days.

(21) Appl. No.: 10/032,814

(22) Filed: Dec. 26, 2001

(65) Prior Publication Data

US 2003/0116186 A1 Jun. 26, 2003

(51) Int. Cl.⁷ ............... H01L 31/058; H01L 31/042
(52) U.S. Cl. ............ 136/253; 136/244; 310/303; 323/906; 323/221; 362/253; 362/159
(58) Field of Search .............. 136/253, 244; 310/303; 323/906, 221; 362/253, 159

(56) References Cited

U.S. PATENT DOCUMENTS

| | | | | |
|---|---|---|---|---|
| 5,057,162 A | * | 10/1991 | Nelson | 136/253 |
| 5,616,186 A | * | 4/1997 | Fraas et al. | 136/253 |
| 6,092,912 A | * | 7/2000 | Nelson | 362/253 |
| 6,235,983 B1 | * | 5/2001 | Becker et al. | 136/253 |
| 6,337,437 B1 | * | 1/2002 | Fraas et al. | 136/253 |
| 2002/0148498 A1 | * | 10/2002 | Nakayama et al. | 136/253 |

FOREIGN PATENT DOCUMENTS

EP  1014454 A2 *  6/2000

* cited by examiner

Primary Examiner—Alan Diamond
(74) Attorney, Agent, or Firm—Ladas & Parry (57) ABSTRACT

The present invention provides a small-scaled portable electrical power generator comprising a base, which includes an assembly surface, a fuel chamber, and at least one fuel delivery channels connected to the fuel chamber and placed under the assembly surface; a power generation means which includes at least one solar battery packs placed on the assembly surface of the base, a solar battery pack contains two opposing solar batteries which face each other with their light-collecting surfaces and their power outputs being connected; a light generation means placed on the assembly surface of the base, which includes at least one hollow tube that is placed in-between the solar batteries of the solar battery packs and includes at least one hollow tube capable of capillarity that is connected to the at least one fuel delivery channels so that fuel can always be filled into them; and an igniting means which includes at least one operative igniters placed nearby the at least one hollow tubes, and can be manipulated to ignite the fuel inside the hollow tubes.

9 Claims, 7 Drawing Sheets

SMALL-SCALED PORTABLE ELECTRICAL POWER GENERATOR

BACKGROUND OF THE INVENTION (A) Field of the Invention

The present invention relates to an electrical power generator, in particular to a small-scaled and portable electrical power generator.

(B) Description of Related Art

There are many existing electrical power generators. However, they are either too large in volume (thus inconvenient to bring) or short in duration to provide power. Thus, a small-scaled electrical power generator able to provide power for a prolonged period of time is needed.

SUMMARY OF THE INVENTION

The object of the present invention is to provide a small-scaled portable electrical power generator.

According to an aspect of the present invention, the small-scaled portable electrical power generator comprises a base, which includes an assembly surface, a fuel chamber, and at least one fuel delivery channel connected to the fuel chamber and placed under the assembly surface; a power generation means, which includes at least one pack of solar battery placed on the assembly surface of the base, a solar battery set contains two opposing solar batteries which face each other with their light-collecting surfaces, and their power outputs are connected; a light generation means placed on the assembly surface of the base, which includes at least one set of hollow tube that is placed in-between the solar batteries of the solar battery packs, each hollow tube set includes at least one hollow tube capable of capillarity and connect to the at least one fuel delivery channel so that fuel can always be filled into them; and an igniting means, which includes at least one operative igniters placed nearby the hollow tubes, and can be manipulated to ignite the fuel inside the hollow tubes.

According to another aspect of the present invention, the small-scaled portable electrical power generator comprises a base, which includes an assembly surface, a fuel chamber, and at least one fuel delivery channel connected to the fuel chamber and placed under the assembly surface; a power generation means, which includes several solar battery packs placed on the assembly surface of the base, each solar battery packs contains two opposing solar batteries which face each other with their light-collecting surfaces while the two adjacent solar batteries of the two adjacent solar battery packs are placed back to back closely, and their power outputs are connected together; a light generation means placed on the assembly surface of the base, which includes several hollow tube packs, each hollow tube pack placed in-between the solar batteries of one solar battery packs and includs several hollow tubes capable of capillarity and connected to the corresponding fuel delivery channels so that fuel can always be filled into them; and an igniting means which includes several operative igniters placed nearby the at least one hollow tube and can be manipulated to ignite the fuel inside the hollow tubes.

The present invention is described below by way of exemplified embodiments with reference to the accompanying drawings, which will make readers understand the purpose, technical contents, characteristics and achievement of the present invention more easily.

DETAILED DESCRIPTION OF THE INVENTION

Figure 1:
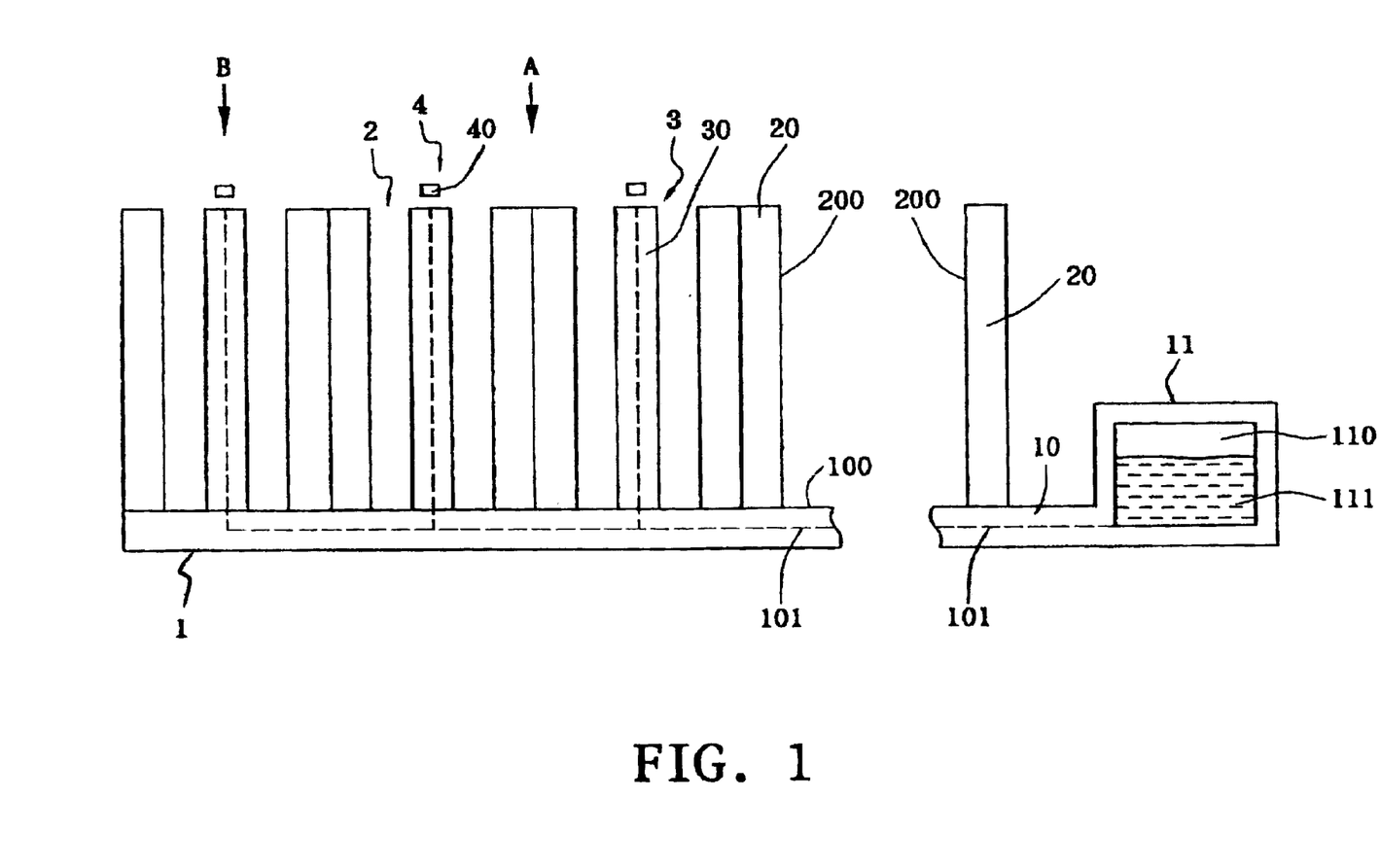
FIG. 1 depicts an end view of a first embodiment of a small-scaled portable electrical power generator of the present invention.

Referring to FIG. 1, the small-scaled portable electrical power generator of the present invention mainly comprises a base 1, a power generation means 2, a light generation means 3, and an igniting means 4.

The base 1 includes an assembly means 10 and storage means 11. The assembly means 10 includes an assembly surface 100 and several fuel delivery channels 101 placed underneath the assembly surface 100. The storage means 11 is placed on one side of the assembly means 10, and includes a fuel chamber 110 for storing fuel 111. The fuel chamber 110 is connected to the fuel delivery channels 101 so that the fuel 111 in the chamber 110 can be supplied to the fuel delivery channels 101.

Figure 2:
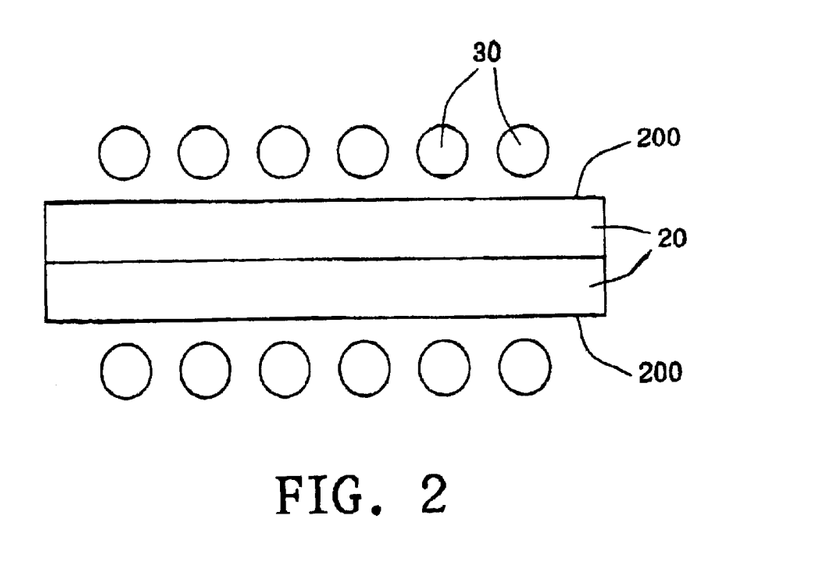
FIG. 2 is a partial plan derived from viewing down from point A of FIG. 1.
Figure 3:
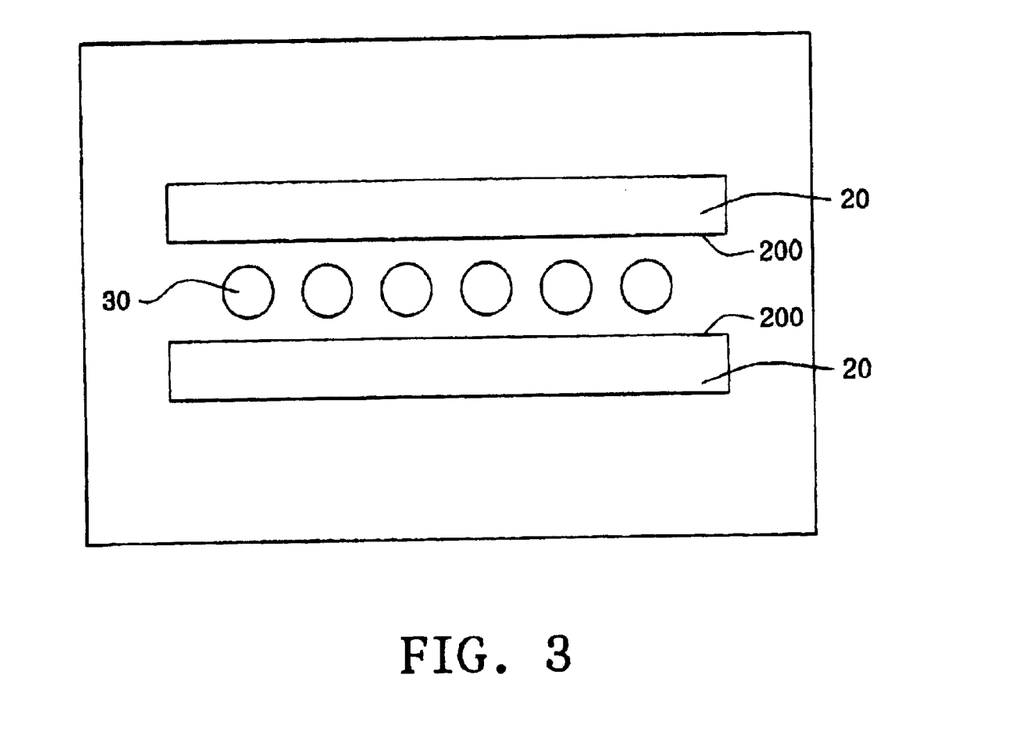
FIG. 3 is a partial plan derived from viewing down from point B of FIG. 1.

Referring to FIG. 2 and FIG. 3, FIG. 2 is a partial plan derived from viewing down from point A of FIG. 1, FIG. 3 is a partial plan derived from viewing down from point B of FIG. 1. The power generation means 2 is placed on the assembly surface 100 of the assembly means 10 of the base 1, and includes several solar battery packs. Each solar battery packs contains two opposing solar batteries 20 which face to each other with their light-collecting surfaces 200 (as shown in FIG. 3), while two adjacent solar batteries 20 of the two adjacent solar battery packs are placed back to back closely (as shown in FIG. 2). The power outputs of those solar batteries 20 (not shown) are connected to each other, thus the power generated by the power generation means 2 is the total of the power generated by a single solar battery 20 multiplied by the number of overall solar batteries.

The light generation means 3 is placed on the assembly surface 100 of the assembly means 10 of the base 1, and includes several hollow tube packs. Each hollow tube pack is placed in-between the solar batteries 20 of the corresponding solar battery packs and includes several hollow tubes 30 capable of capillarity. The several hollow tubes 30 are connected to the corresponding fuel delivery channels 101 so that fuel 111 inside the fuel delivery channels 101 can always be filled into them.

It should be aware that the surfaces of the hollow tubes 30 could be painted with a material so that only the lights with wavelengths acceptable by the solar batteries 20 can pass through them. For example, lights with wavelengths of 450 nm to 650 nm or 650 nm to 850 nm.

The igniting means 4 includes several operative igniters 40 placed nearby the corresponding hollow tubes 30, and can be manipulated to ignite the fuel inside the hollow tubes 30.

From the structure described above, each hollow tube 30 will always be filled with fuel 111 from the corresponding fuel delivery channel 101 due to the capillarity. When the igniter 40 is operated, the fuel 111 inside the hollow tube 30 is ignited so as to produce light. The solar batteries 20 turn the photo-energy into electric energy, and then output the electric energy from their power outputs to provide power to the peripheral electrical devices (not shown).

It should be noticed that the fuel 111 inside the hollow tubes 30 of the present invention is ignited to produce light, thus the device of the present invention can be used as a fuel lamp for illumination during nighttime. Besides, because of the heat produced from the ignition of the fuel 111, the device of the present invention can also be used as a fuel stove for heating.

Figure 4:
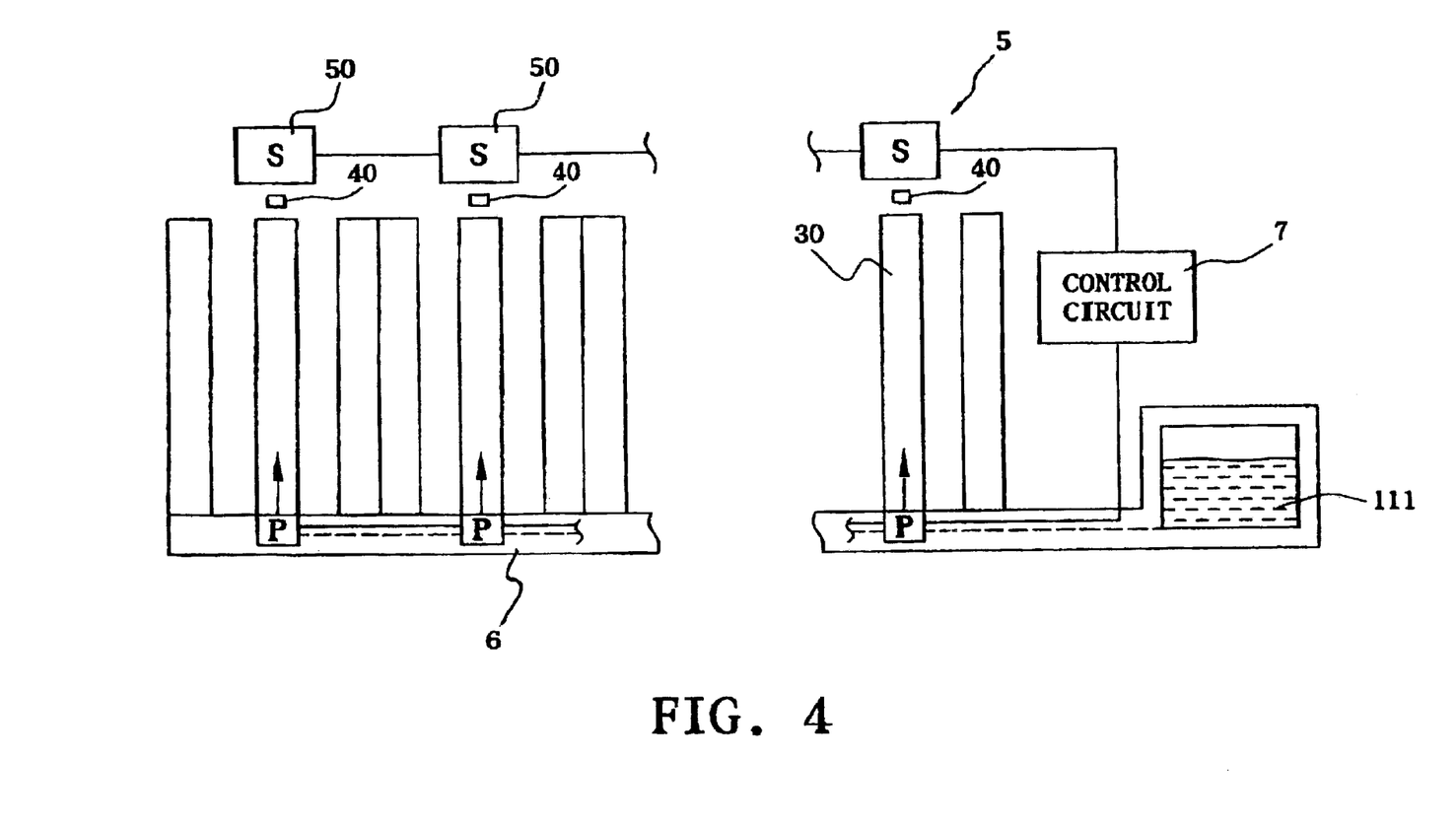
FIG. 4 depicts a 3-D image of a second embodiment of the small-scaled portable electrical power generator of the present invention.

Referring to FIG. 4, a second embodiment of the small-scaled portable electrical power generator is shown. The difference between the present embodiment and the first embodiment is that the present embodiment further comprises a temperature-sensing means 5, a pump means 6, and a control circuit 7.

The temperature-sensing means 5 includes several temperature sensors 50. The temperature sensors 50 are placed nearby the corresponding hollow tubes 30 for sensing the temperature and outputting the temperature reading of the corresponding hollow tubes 30.

The pump means 6 includes several pumps 60. Each pump 60 is placed in-between a hollow tube 30 and its corresponding fuel delivery channel 101. The pumps 60 can be manipulated to compel the fuel 111 inside the fuel delivery channels 101 to get into the corresponding hollow tubes 30.

The control circuit 7 is electrically connected to the temperature sensors 50 and the pumps 60. The control circuit 7 receives the temperature reading from the temperature sensors 50 and compares the values with a preset reference value. If the receiving value is lower than the preset reference value, it indicates the fuel inside the corresponding hollow tube 30 is insufficient, and the control circuit 7 then manipulates the corresponding pump 60 for compelling the fuel 111 inside the corresponding fuel delivery channel 101 to get into the corresponding hollow tube 30.

From the structure of the second embodiment, when a hollow tube 30 cannot draw in the fuel 111 for some reasons, the corresponding pump 60 can be started to compel the fuel 111 to get into the corresponding hollow tube 30.

Moreover, the set up of the temperature sensors 50 can also prevent panels 200 of the solar batteries 20 from damage due to the superheat of the hollow tubes 30.

Figure 5:
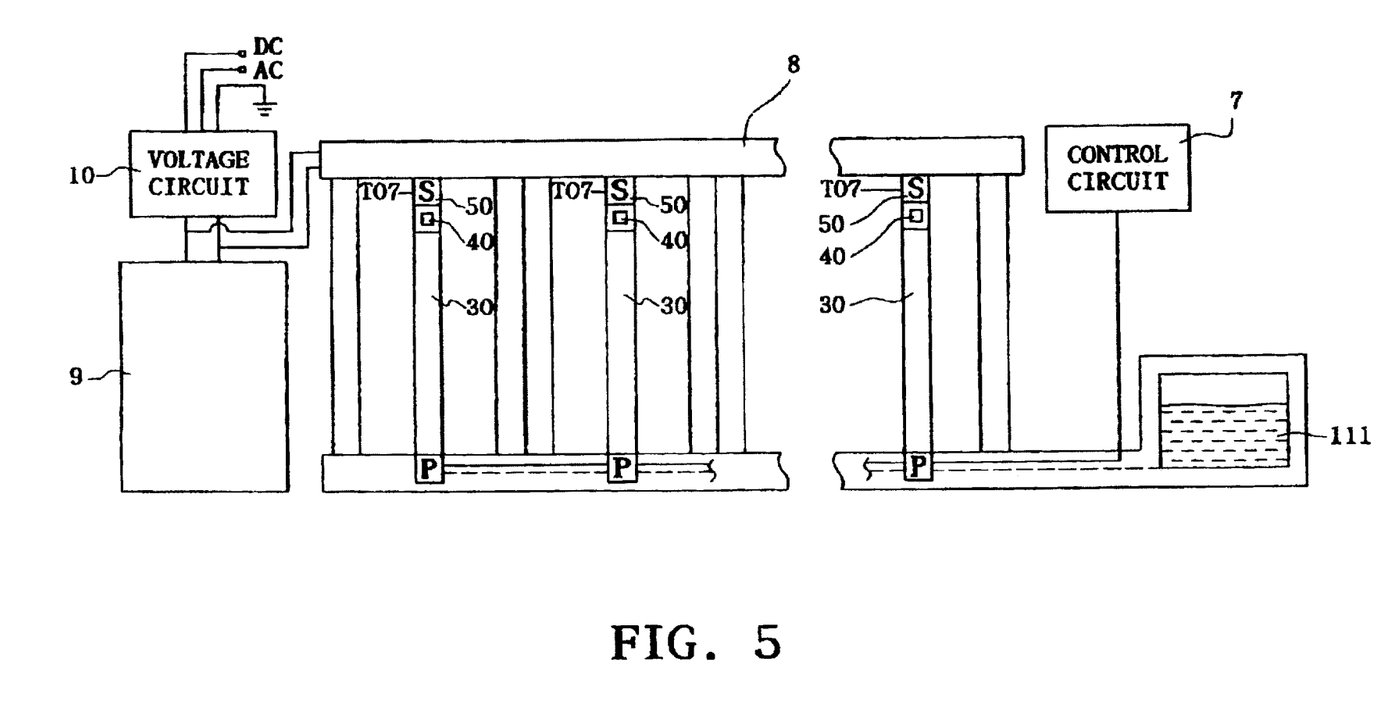
FIG. 5 depicts a 3-D image of a third embodiment of the small-scaled portable electrical power generator of the present invention.

Referring to FIG. 5, a third embodiment of the present invention is shown. The difference between the present embodiment and the second embodiment is that the present embodiment further comprises a heat exchanger 8, a battery 9, and a power supply means 10. The heat exchanger 8 is placed on the top of the hollow tubes 30 so as to absorb the heat came from the ignition of the fuel 111 inside the hollow tubes 30 and turn it into electric energy, thus achieve the purposes of heat dispersion and resource utilization. The power output of the heat exchanger 8 (not shown) together with the power outputs of the solar batteries 20 are electrically connected to the input end of the power supply means 10.

Figure 6:
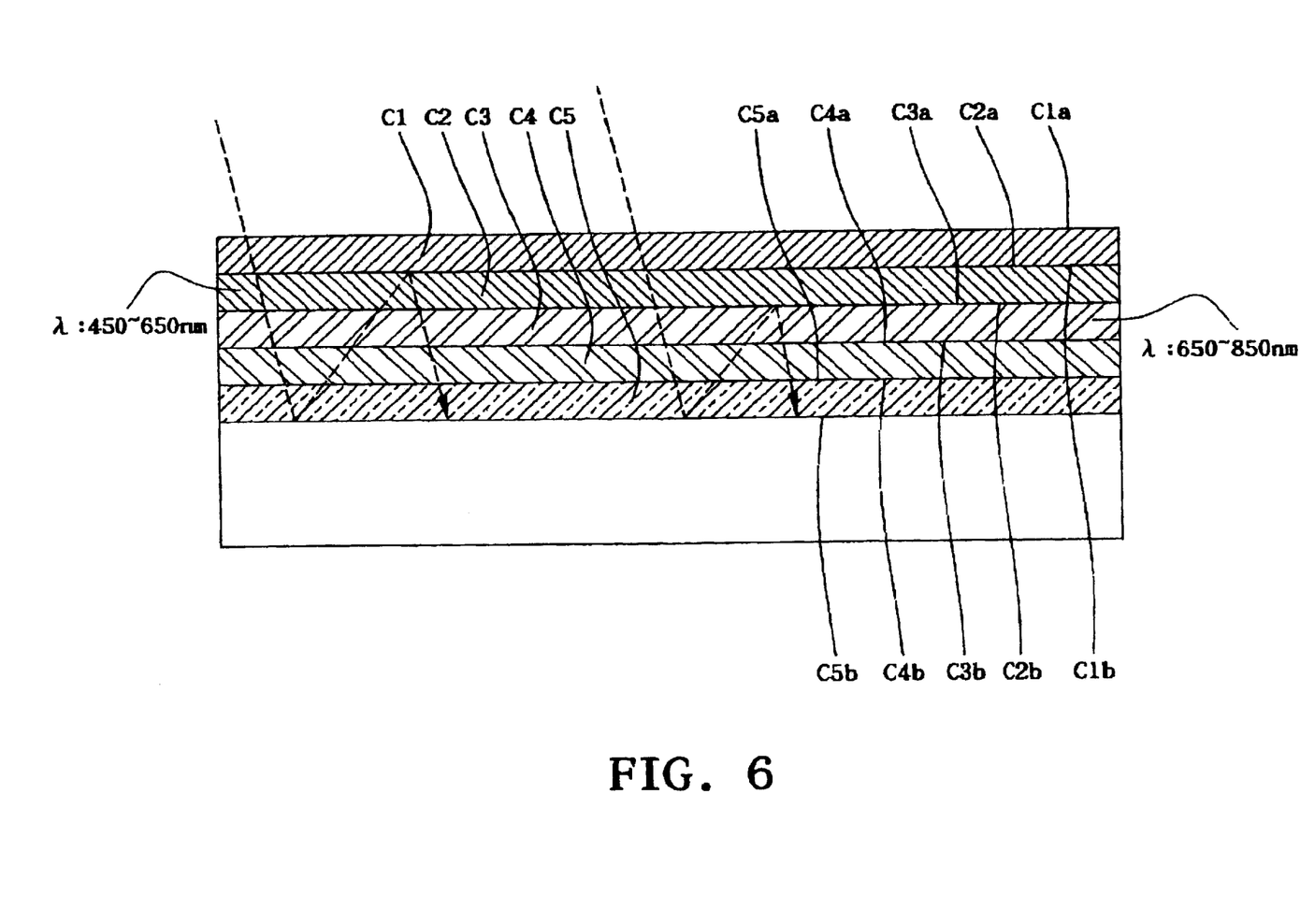
FIG. 6 shows another embodiment of the solar batteries of the solar battery pack of the power generation means of the present invention.

FIG. 6 shows another embodiment of the solar batteries 20 of the solar battery pack of the power generation means 2 of the present invention. In this embodiment, several coating layers C1 to C5 are disposed on every light-collecting surface 200 of the solar batteries 20, and the material of each coating layer is different. Each of the coating layers (C1 to C5) has a first surface (C1a to C5a) which permits a light to pass through and a second surface (C1b to C5b) which prohibits a specific wavelength light from passing through. Therefore, when a light emits into the coating layers C1 to C5 and arrives to the light-collecting surface 200 of the solar batteries 20, a part of the incident light will be reflected. Only a part of the reflected light whose wavelength is different from the predetermined wavelength of the second surfaces C1b to C5b of the coating layers C1 to C5 can pass through the coating layers C1 to C5, and the other part of the reflected light that cannot pass the coating layers C1 to C5 will reflect to the light-collecting surface 200 of the solar batteries 20. Thus, the light utilization will be raised, and the performance of the power generation means 2 of the present invention will also be improved.

Figure 7:
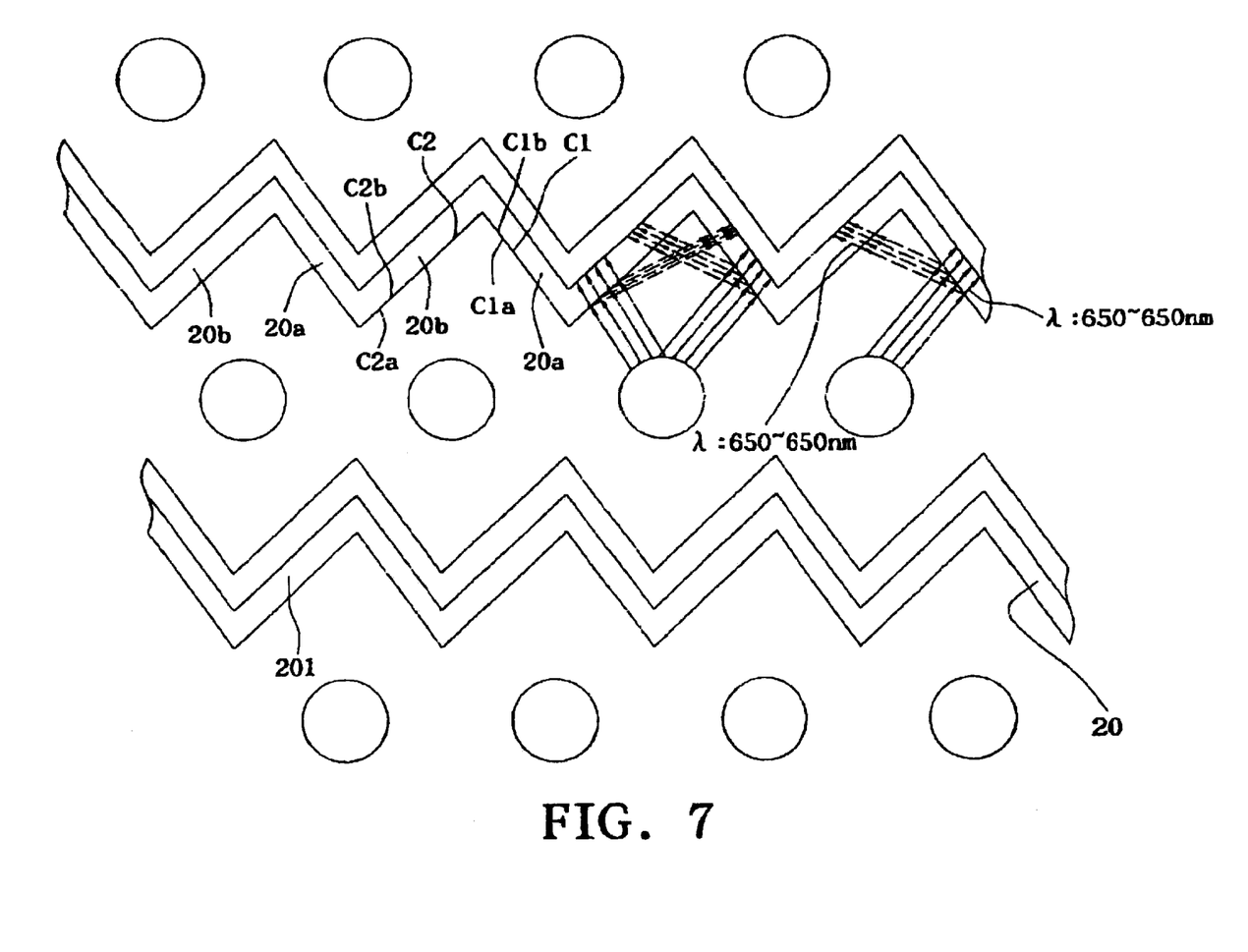
FIG. 7 shows another embodiment of the solar batteries of the solar battery pack of the power generation means of the present invention.

FIG. 7 shows another embodiment of the solar batteries 20 of the solar battery pack of the power generation means 2 of the present invention. In this embodiment, every solar battery 20 of the solar battery pack is formed by several battery segments 20a and 20b in a "Z" shape, and a first coating layer C1 and a second coating layer C2 of the light-collecting surfaces 200 of the neighboring solar batteries 20a and 20b are formed by different materials. In this embodiment, the first coating layer C1 and the second coating layer C2 permit a first predetermined wavelength light and a second predetermined wavelength light to pass through their first surfaces C1a and C1b but prohibit the above predetermined wavelength lights from passing through their second surfaces C1b and C2b. Therefore, when incident lights emit into the first surfaces C1a and C2a of the coating layers C1 and C2 of one of the battery segments 20a and 20b, only the part of the incident light whose wavelength is the same with the predetermined wavelength of the C1 and C2 can pass through the coating layers C1 and C2. When the part of incident light passing through the coating layers C1 and C2 emits into the battery segments 20a and 20b, a part of the light will be reflected. When the reflected light emits into the second surfaces C1b and C2b of the coating layers C1 and C2, due to an incapability to pass through the coating layers C1 and C2, the reflected light will be further reflected to the light-collecting surface 200 of the battery segments 20a and 20b. As to the reflected light which cannot pass through the first coating surfaces C1a and C2a of the coating layers C1 and C2, it will emits into the first surfaces C1a and C2a of the neighboring coating layers, which forms a sharp angle with the original coating layer. The lights which have a corresponding wavelength with the neighboring coating layers C1 and C2 will pass through the neighboring coating layers C1 and C2, and the other wavelength will be reflected. Since the next actions of the lights which have passed the neighboring coating layers C1 and C2 or have not passed are the same as the description mentioned above, the next description would be omitted herein. Thus, the light utilization will be raised, and the performance of the power generation means 2 of the present invention will be also improved.

Figure 8:
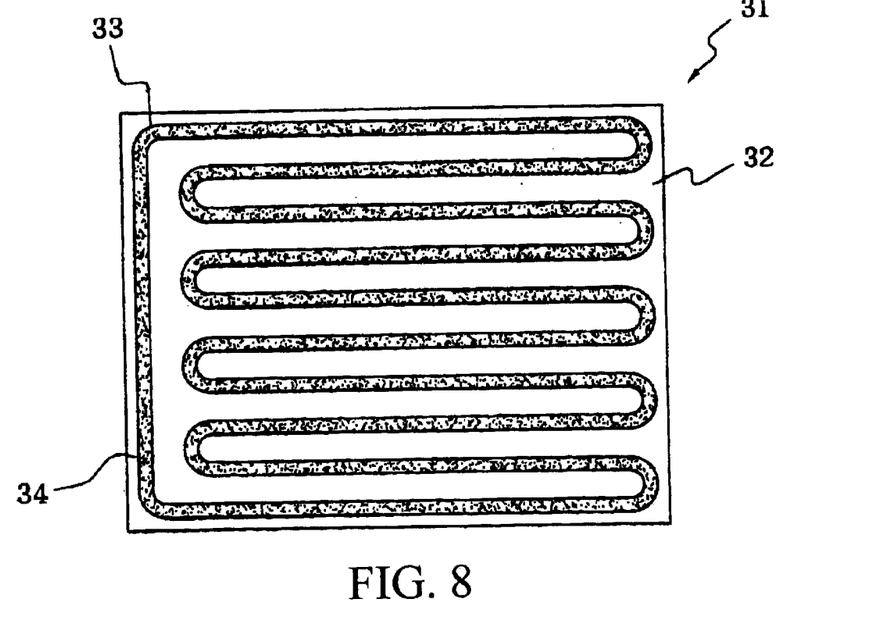
FIG. 8 depicts another type of the light generation means of the small-scaled protable electrical power generator of the present invention.

Referring to FIG. 8, another type of the light generation means 3 of the small-scaled protable electrical power generator of the present invention is shown.

As shown in FIG. 8, the light generation means 3 comprises several light generation plates 31 (only one plate is shown in the figure). Each light generation plate 31 has a transparent casing 32 and a liquid tube 33 inside the casing 32. The liquid tube 33 winds in the casing 32 and froms a circuit. A liquid fluorescence material 34 is filled in the liquid tube 33. Thus, when the bottom of the casing 32 is heated, the liquid fluorescence material 34 in the liquid tube 33 will flow circularly in the liquid tube 33 and emit light.

Figure 9:
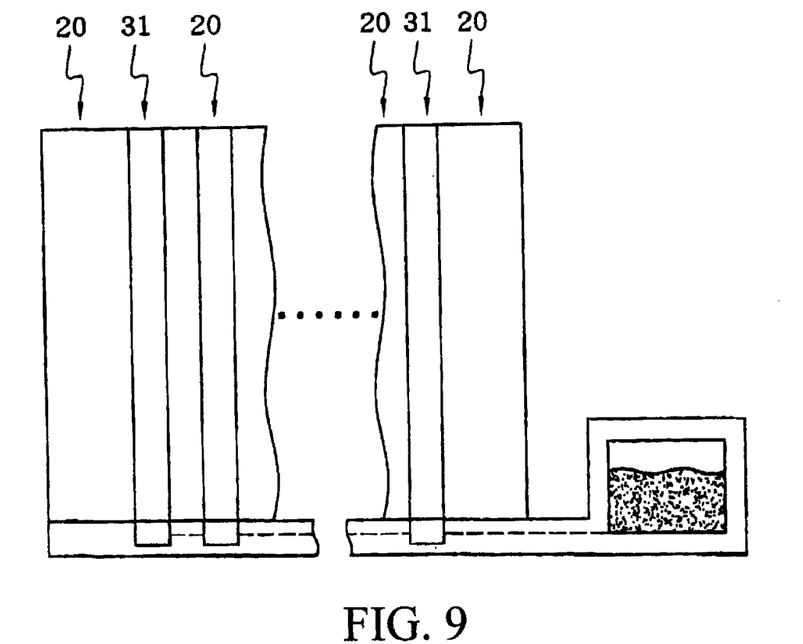
FIG. 9 depicts an end view of yet another embodiment of a small-scaled portable electrical power generator of the present invention.

Referring to FIG. 9, each light generation plate 31 of the light generation means 3 is placed in-between two solar batteriew 20 of the corresponding solar battery pack, and the position is above the corresponding fuel delivery channel 101. Thus, when the fuel 111 is deliveried to the bottom of the corresponding light generation plate 31 and burns, the liquid fluorescence material 34 in the liquid tube 33 will be heated and flow circularly in the tube 33, and emit light.

It shold be understood that the light generation plate 33 can be very thin so that it can stay closely to the solar battery 20. Thus, the volume of the power generator of the present invention can be further reduced.

It should be noted that the solar batteries 20 are placed on the base 1 in the present embodiment. However, the solar batteries 20 can also be placed on the heat exchanger 8 so that the base 1 can be changed.

The function of the battery 9 is that when the electrical power generator of the present invention is operated without connecting to the peripheral electrical devices, the power generated thereof will be stored in the battery 9. For example, when the device of the present invention is used as a fuel lamp, the power generated will be stored in the battery 9.

The input end of the power supply means 10 can also be connected to the battery 9 so that the power supply means 10 can utilize the power of the battery 9 or make directly use of the power came from the solar batteries 20 and the heat exchanger 8. It should be noticed that the power supply means 10 provides both AC and DC power.

The technical contents and features of the present invention are disclosed above. However, anyone familiar with the technique can make modification or change the details in accordance with the present invention without departing from the technologic ideas and spirit of the invention. The protection scope of the present invention shall not be limited to what the embodiment discloses, but shall include various modification and changes that are made without departing from the technologic ideas and spirit of the invention, and shall be covered by the claims mentioned below.

What is claimed is:

1. A small-scaled portable electrical power generator, comprising:

a base including an assembly surface, a fuel chamber, and at least one fuel delivery channel connected to the fuel chamber and placed under the assembly surface;

a power generation means including at least one solar battery pack placed on the assembly surface of the base, the solar battery pack including two solar batteries, each of the two solar batteries having a light-collecting surface facing to each other, and power outputs of the two solar batteries being connected together;

a light generation means placed on the assembly surface of the base, including at least one hollow tube pack placed between the solar batteries of the solar battery pack, each of the hollow tube packs including at least one hollow tube and drawing the fuel up therethrough by capillarity from the at least one fuel delivery channel; and an igniting means including at least one operative igniter placed nearby the at least one hollow tube and used to ignite the fuel inside the hollow tubes, wherein the solar batteries are formed by several battery segments in a Z shape, a light-collecting surface of each battery segment is disposed with at least one coating layer having a first surface and a second surface, the first surface of the coating layer permits at least one specific wavelength of incident light to pass through, and the second surface of the coating layer prohibits a specific wavelength of light from passing through.

2. The electrical power generator according to claim 1, further comprising a heat exchanger, placed on the top of the at least one hollow tube so as to absorb heat generated by fuel ignition in the hollow tube and convert it to electric energy, wherein power outputs of the heat exchanger and the solar batteries are connected together.

3. The electrical power generator according to claim 2, further comprising:

a temperature-sensing means including at least one temperature sensor, being placed nearby the at least one hollow tube for sensing the temperature of the at least one hollow tube;

a pump means including at least one pump placed between the at least one hollow tube and the corresponding fuel delivery channel, the at least one pump used to draw up the fuel inside the fuel delivery channel into the at least one hollow tube; and a control circuit electrically connected to the at least one temperature sensor and the at least one pump, the control circuit receiving a temperature reading from the temperature sensor and comparing the temperature reading with a reference value, the control circuit activating the at least one pump to draw up the fuel inside the corresponding fuel delivery channel into the corresponding hollow tube when the temperature reading is lower than the reference value.

4. The electrical power generator according to claim 1, wherein a surface of the at least one hollow tube is disposed with a material so that only light with a wavelength acceptable by the solar batteries can pass.

5. The electrical power generator according to claim 1, wherein the light generation means further comprises several light generation plates.

6. The electrical power generator according to claim 5, wherein each light generation plate includes a transparent casing and a liquid tube inside the casing.

7. The electrical power generator according to claim 6, wherein a liquid fluorescence material is filled inside the each liquid tube.

8. A small-scaled portable electrical power generator, comprising:

a base including an assembly surface, a fuel chamber, and several fuel delivery channels connected to the fuel chamber and placed under the assembly surface;

a power generation means including several solar battery packs placed on the assembly surface of the base, each of the solar battery packs containing two solar batteries, each of the two solar batteries having a light-collecting surface facing each other, each of the light-collecting surfaces of adjacent solar batteries of adjacent solar battery packs facing away from each other, and power outputs of the two solar batteries of each solar battery pack being connected together;

a light generation means placed on the assembly surface of the base and including several hollow tube packs, each of the hollow tube packs being placed between the two solar batteries of each solar battery pack and including at least one hollow tubes drawing the fuel up therethrough by capillarity from the fuel delivery channel; and an igniting means including several operative igniters placed nearby a corresponding hollow tube and used to ignite the fuel inside the hollow tube.

9. The electrical power generator according to claim 8, wherein the light-collecting surface of the solar batteries is disposed with at least one coating layer having a first surface and a second surface, the first surface of the coating layer permits incident light to pass through, and the second surface of the coating layer prohibits a specific wavelength of light from passing through.

* * * * *